United States Patent
Ge et al.

(10) Patent No.: US 11,133,538 B2
(45) Date of Patent: Sep. 28, 2021

(54) HEAT EXCHANGER FOR COOLING BATTERY

(71) Applicant: NIO (ANHUI) HOLDING CO., LTD., Hefei (CN)

(72) Inventors: Zengfang Ge, Shanghai (CN); Qi Zhang, Shanghai (CN); James Deng, Shanghai (CN); Li Ma, Shanghai (CN)

(73) Assignee: NIO (ANHUI) HOLDING CO., LTD., Hefei (CN)

( * ) Notice: Subject to any disclaimer, the term of this patent is extended or adjusted under 35 U.S.C. 154(b) by 83 days.

(21) Appl. No.: 16/340,602

(22) PCT Filed: Jul. 28, 2017

(86) PCT No.: PCT/CN2017/095002
§ 371 (c)(1),
(2) Date: Apr. 9, 2019

(87) PCT Pub. No.: WO2018/064916
PCT Pub. Date: Apr. 12, 2018

(65) Prior Publication Data
US 2019/0237827 A1 Aug. 1, 2019

(30) Foreign Application Priority Data

Oct. 9, 2016 (CN) .......................... 201610881121.0

(51) Int. Cl.
*H01M 10/613* (2014.01)
*H01M 10/6554* (2014.01)
(Continued)

(52) U.S. Cl.
CPC ........... *H01M 10/613* (2015.04); *F28F 13/06* (2013.01); *F28F 13/12* (2013.01); *H01M 10/653* (2015.04);
(Continued)

(58) Field of Classification Search
CPC ........... H01M 10/653; H01M 10/6554; H01M 10/6556; H01M 10/6568; F28F 13/06; F28F 13/12; F28F 2275/14; H05K 7/20254
See application file for complete search history.

(56) References Cited

U.S. PATENT DOCUMENTS

2014/0090823 A1\* 4/2014 Moser ........................ F28F 1/00
165/169
2019/0003786 A1\* 1/2019 Birkett ...................... F28F 9/26

FOREIGN PATENT DOCUMENTS

| CN | 204090418 | 1/2015 |
| CN | 204718449 | 10/2015 |

(Continued)

OTHER PUBLICATIONS

International Search Report prepared by the State Intellectual Property Office of the P.R. China dated Sep. 30, 2017, for International Application No. PCT/CN2017/095002.
(Continued)

*Primary Examiner* — Jon T. Schermerhorn, Jr.
(74) *Attorney, Agent, or Firm* — Sheridan Ross P.C.

(57) ABSTRACT

The present invention relates to the technical field of batteries of new energy vehicle, and in particular to a heat exchanger for cooling battery. The present invention aims to solve the problem that existing heat exchangers in the prior art have low heat exchange efficiency and lack of expandability. For this purpose, the heat exchanger for cooling battery according to the present invention comprises a first liquid collection unit, a second liquid collection unit and at least one cooling plate unit provided between the first liquid collection unit and the second liquid collection unit, the first liquid collection unit at least comprising a first liquid collection area, the second liquid collection unit at least comprising a second liquid collection area, and the cooling (Continued)

plate unit comprising a plurality of flow guide elements. Through a modular design, the present invention can make combinations and changes according to variation of size of a battery pack, bring about great degree of freedom in size, reduce cost and shorten production cycle. In addition, a coolant flows in all directions under the action of the flow guide elements, which is advantageous for a uniform distribution of speed in the cooling plate unit and a more uniform distribution of temperature over the entire region of the cooling plate unit. Meanwhile, heat conducting elements play the role of enhancing heat exchange, which is advantageous for an improvement of heat exchange efficiency of the cooling plate.

11 Claims, 4 Drawing Sheets

(51) Int. Cl.
*H01M 10/6568* (2014.01)
*F28F 13/12* (2006.01)
*H01M 10/653* (2014.01)
*F28F 13/06* (2006.01)
*H01M 10/6556* (2014.01)

(52) U.S. Cl.
CPC ... *H01M 10/6554* (2015.04); *H01M 10/6556* (2015.04); *H01M 10/6568* (2015.04)

(56) References Cited

FOREIGN PATENT DOCUMENTS

| | | |
|---|---|---|
| CN | 205159462 | 4/2016 |
| JP | 2014-212032 | 11/2014 |

OTHER PUBLICATIONS

Written Opinion prepared by the State Intellectual Property Office of the P.R. China dated Sep. 30, 2017, for International Application No. PCT/CN2017/095002.

\* cited by examiner

HEAT EXCHANGER FOR COOLING BATTERY

CROSS REFERENCE TO RELATED APPLICATIONS

This application is a national stage application under 35 U.S.C. 371 and claims the benefit of PCT Application No. PCT/CN2017/095002 having an international filing date of 28 Jul. 2017, which designated the United States, which PCT application claimed the benefit of China Patent Application No. 201610881121.0 filed 9 Oct. 2016, the disclosure of each of which are incorporated herein by reference.

FIELD OF THE INVENTION

The present invention relates to the technical field of batteries of new energy vehicle, and in particular to a heat exchanger for cooling battery.

BACKGROUND OF THE INVENTION

Development of electric vehicles has drawn widespread attention at present, and battery, as the heart of an electric vehicle, is the focus of research of electric vehicles. Generally, batteries of electric vehicles are used in the form of a power battery pack, which would produce plenty of heat in use, especially in the process of quick charge or discharge and high speed driving. In order to ensure that the batteries work within a proper temperature range, there is a need for effective cooling of the battery pack. In the prior art, a heat exchanger for battery pack is usually formed by extruding an upper plate and a lower plate or a single metal plate, and the metal plates are connected by brazing or friction stir welding. Internal fluid flow channels are basically formed by stamping or extruding. Fluid mostly flows in the form of advection or turbulent flow in an internal cavity, resulting in a low coefficient of heat transfer. In addition, in order to achieve electrical insulation, the metal plates are covered with a plastic film or an insulating mat after being connected. In this case, complexity and cost of the battery pack system are increased.

Besides, as competition goes intense increasingly, cost control and light weight of vehicle design become important indices. As for conventional design of water cooling plates, a water cooling plate structure is designed and machined upon specific requirements, has constant structure sizes, and needs to be redesigned and manufactured using a new mold if the battery module or battery pack is changed in structure. Water cooling plates has poor expandability at a later stage and also has a high machining cost.

Accordingly, there is a need for a new heat exchanger to solve the above technical problems in the prior art.

SUMMARY OF THE INVENTION

In order to solve the above technical problems in the prior art, namely, to solve the problems of low heat exchange efficiency and no expandability of existing heat exchangers, the present invention provides a novel heat exchanger for cooling battery. The heat exchanger for cooling battery comprises a first liquid collection unit, a second liquid collection unit, and at least one cooling plate unit arranged between the first liquid collection unit and the second liquid collection unit, the first liquid collection unit at least comprising a first liquid collection area, the second liquid collection unit at least comprising a second liquid collection area, and the cooling plate unit comprising a plurality of flow guide elements; wherein an inner wall of the first liquid collection unit, an inner wall of the second liquid collection unit, an inner wall of the cooling plate unit and the flow guide elements together form a flow space for coolant.

In a preferred embodiment of the above heat exchanger for cooling battery, the flow guide elements are of a thin-wall cylindrical shape, and are arranged alternately on the cooling plate unit in a coolant flow direction.

In a preferred embodiment of the above heat exchanger for cooling battery, the cooling plate unit comprises a first connection structure and a second connection structure; the first liquid collection unit is provided with a third connection structure matching with the first connection structure; the second liquid collection unit is provided with a fourth connection structure matching with the second connection structure; and the first connection structure and the third connection structure, as well as the second connection structure and the fourth connection structures are respectively connected together in a way of being inserted into each other.

In a preferred embodiment of the above heat exchanger for cooling battery, the first connection structure of the cooling plate unit is connectable to the second connection structure in a way of being inserted into each other, so that the cooling plate unit can be added between the first liquid collection area and the second liquid connection area.

In a preferred embodiment of the above heat exchanger for cooling battery, the first connection structure and the third connection structure, the second connection structure and the fourth connection structure, as well as the first connection structure and the second connection structure are respectively connected together in a way of being inserted into each other, and are sealed by adhesive, fusion welding or laser welding.

In a preferred embodiment of the above heat exchanger for cooling battery, the first liquid collection unit, the second liquid collection unit and the cooling plate unit are all made of thermally conductive plastic material.

In a preferred embodiment of the above heat exchanger for cooling battery, the cooling plate unit and the flow guide elements are formed integrally through injection molding.

In a preferred embodiment of the above heat exchanger for cooling battery, the first liquid collection unit further comprises a third liquid collection area, and a first liquid inlet in communication with the first liquid collection area and a first liquid outlet in communication with the third liquid collection area, a first partition is provided between the third liquid collection area and the first liquid collection area, and the cooling plate unit at least comprises a first cooling plate unit and a second cooling plate unit, the first cooling plate unit and the second cooling plate unit each have one end in sealing connection with the first liquid collection unit, and the other end in sealing connection with the second liquid collection unit, a coolant flows in through the first liquid inlet, passes through the first liquid collection area, the first cooling plate unit, the second liquid collection area, the second cooling plate unit and the third liquid collection area in sequence, and flows out through the first liquid outlet.

In a preferred embodiment of the above heat exchanger for cooling battery, the first liquid collection unit further comprises a fourth liquid collection area and a second liquid inlet in communication with the first liquid collection area, the second liquid collection unit further comprises a fifth liquid collection area and a second liquid outlet in communication with the fifth liquid collection area, a second partition is provided between the fourth liquid collection area and the first liquid collection area, a third partition is provided between the fifth liquid collection area and the second liquid collection area, and the cooling unit at least comprises a third cooling unit, a fourth cooling unit and a fifth cooling unit, the third cooling unit, the fourth cooling unit and the fifth cooling unit each have one end in sealing connection with the first liquid collection unit, and the other end in sealing connection with the second liquid collection unit, a coolant flows in through the second liquid inlet, passes through the first liquid collection area, the third cooling plate unit, the second liquid collection area, the fourth cooling plate unit, the fourth liquid collection area, the fifth cooling plate unit and the fifth liquid collection area in sequence, and flows out through the second liquid outlet.

In a preferred embodiment of the above heat exchanger for cooling battery, the first liquid collection unit further comprises a third liquid inlet in communication with the first liquid collection area, the second liquid collection unit further comprises a third liquid outlet in communication with the second liquid collection area, the cooling unit at least comprises a sixth cooling unit, a seventh cooling unit and an eighth cooling unit, the sixth cooling unit, the seventh cooling unit and the eighth cooling unit each have one end in sealing connection with the first liquid collection unit, and the other end in sealing connection with the second liquid collection unit, a coolant flows into the first liquid collection area from the third liquid inlet, into the second liquid collection area along the sixth cooling unit, the seventh cooling unit and the eighth cooling unit respectively, and flows out through the third liquid outlet.

In the technical solutions of the present invention, through a modular design, the heat exchanger for cooling battery can make corresponding adjustment according to change of structure or size of a battery pack, bring about great degree of freedom in structure and size, reduce cost and shorten production cycle. In addition, the coolant flows in all directions under the action of the flow guide elements arranged alternately, so as to thereby form a turbulent flow, which is advantageous for a uniform distribution of speed in the cooling plate unit and a more uniform distribution of temperature over the entire region of the cooling plate unit, and meanwhile advantageous for improving heat exchange efficiency of the cooling plate.

DETAILED DESCRIPTION OF THE PREFERRED EMBODIMENTS

Preferred embodiments of the present invention will be described below with reference to the accompanying drawings. It should be understood by those skilled in the art that these embodiments are merely provided for interpreting technical principle of the present invention, rather than limiting the scope of protection of the present invention. For example, while various components in the drawings are drawn in certain proportionalities, such proportionalities are not constant, and those skilled in the art can make adjustment as required for adaption to specific applications.

It should be noted that in the description of the present invention, terms "center", "upper", "lower", "left", "right", "vertical", "horizontal", "inner", "outer" or the like that indicate directions or positional relationships are based on the directions or positional relationships as shown in the drawings, which are provided merely for facilitating describing the invention and simplifying description, rather than indicating or implying that the devices or elements must have the particular orientations and be constructed and operated in the particular orientations. Therefore, they should not be construed as limiting the present invention. In addition, terms "first", "second" and "third" are used for descriptive purposes only and they should not be construed as indicating or implying relative importance.

Besides, it should also be noted that in the description of the present invention, terms "installation", "coupling" and "connection" should be interpreted in a broad sense unless specifically indicated or defined otherwise. For example, "connection" may be fixed connection, or detachable connection, or integral connection; it may be mechanical connection, or also be electrical connection; "coupling" may be direct coupling, or also be indirect coupling via an intermediate medium, or may be internal communication between two elements. Those skilled in the art can interpret the specific meanings of the above terms in the present invention as actually required.

Figure 1:
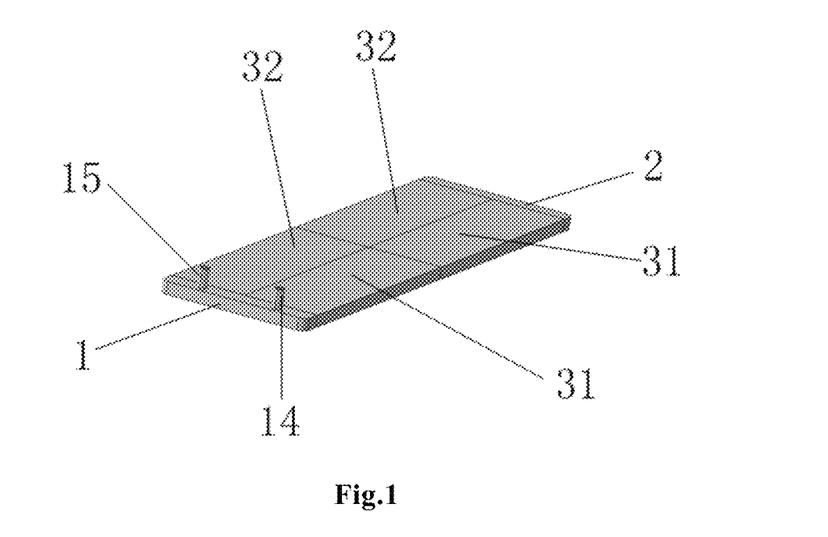
FIG. 1 is a view showing an overall structure of a heat exchanger for cooling battery according to a first embodiment of the present invention.

A heat exchanger for cooling battery according to the present invention comprises a first liquid collection unit, a second liquid collection unit, and at least one cooling plate unit arranged between the first liquid collection unit and the second liquid collection unit, the first liquid collection unit at least comprising a first liquid collection area, the second liquid collection unit at least comprising a second liquid collection area, and the cooling plate unit comprising a plurality of flow guide elements; wherein an inner wall of the first liquid collection unit, an inner wall of the second liquid collection unit, an inner wall of the cooling plate unit and the flow guide elements together form a flow space for coolant. Specifically, reference is made to FIG. 1, which is a view showing an overall structure of a heat exchanger for cooling battery according to a first embodiment of the present invention. As shown in FIG. 1, in the present embodiment, a heat exchanger for cooling battery comprises a first liquid collection unit 1, a second liquid collection unit 2, and four cooling plate units arranged between the first liquid collection unit 1 and the second liquid collection unit 2, wherein the four cooling plate units comprises two first cooling plate units 31 and two second cooling plate units 32. Those skilled in the art can understand that in the present embodiment, the four cooling plate units are taken as an example for description of the present invention so as to illustrate the structure of the heat exchanger for cooling battery of the present invention more clearly, and the number of the cooling plate units should not be construed as limiting the scope of protection of the present invention. Besides, the cooling plate units of the present invention can comprises only one first cooling plate unit 31 and only one second cooling plate unit 32. Four cooling plate units are taken as an example in order to explain more clearly that the heat exchanger for cooling battery according to the present invention is expandable, which will be set forth specifically below.

Figure 2:
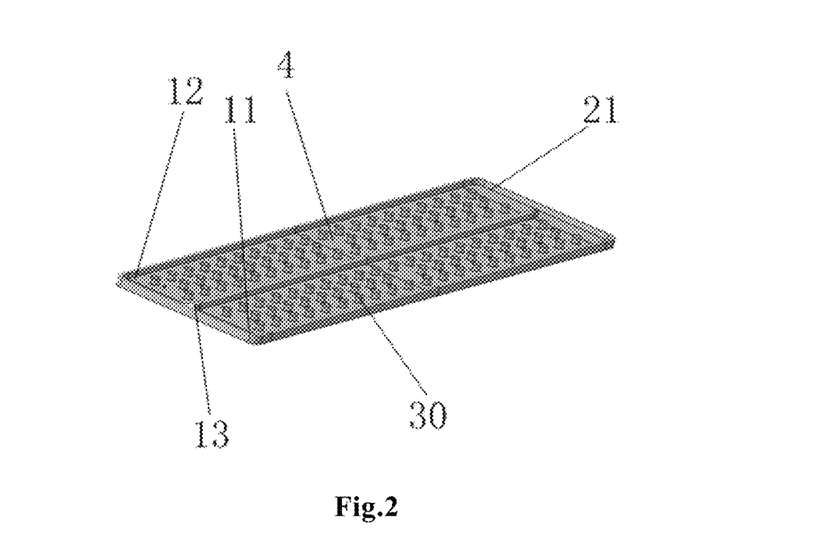
FIG. 2 is a cross-sectional view showing the overall structure of the heat exchanger for cooling battery according to the first embodiment of the present invention.
Figure 6:
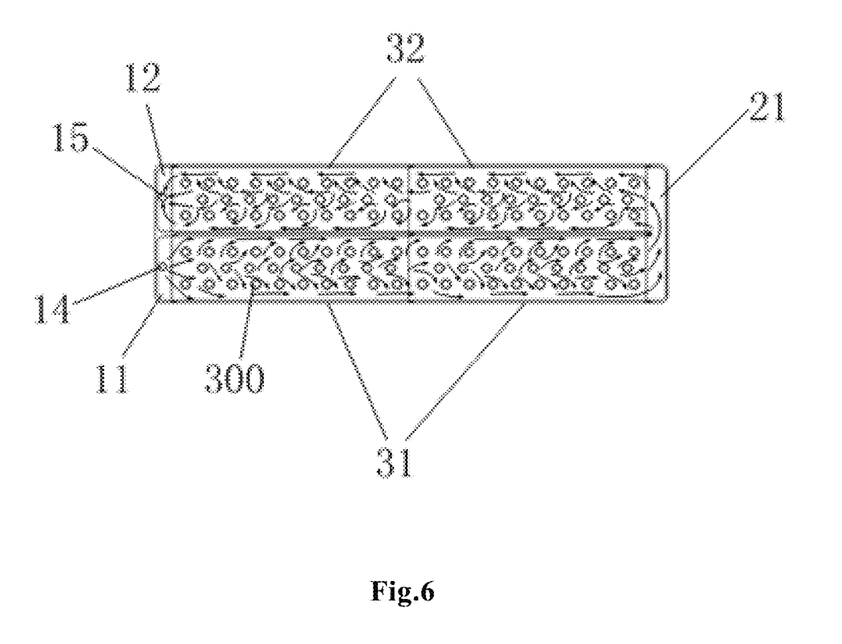
FIG. 6 is a view showing a coolant flow path of the heat exchanger for cooling battery according to the first embodiment of the present invention.

Reference is made to FIG. 2, which is a cross-sectional view showing the overall structure of the heat exchanger for cooling battery according to the first embodiment of the present invention. As shown in FIG. 2, the first liquid collection unit 1 comprises a first liquid collection area 11 and a third liquid collection area 12. The second liquid collection unit 2 comprises a second liquid collection area 21. A plurality of flow guide elements 300 are regularly distributed on the first cooling plate unit 31 and the second cooling plate unit 32. Preferably, the flow guide elements 300 are of a thin-walled structure. Specifically, as shown in FIG. 2, the flow guide elements 300 are thin-walled cylinders disposed vertically (or at other angles) on the first cooling plate unit 31 and the second cooling plate unit 32. Moreover, as best shown in FIG. 6, the flow guide elements 300 are arranged alternately with each other in a flow direction of a coolant so that the coolant can form a turbulent flow when flowing. More specifically, according to the orientation in FIG. 6, by "arranged alternately", it means that two air guiding elements 300 adjacent to each other in a vertical direction are not aligned with each other in the vertical direction, but are staggered from each other. An inner wall of the first liquid collection unit 1, an inner wall of the second liquid collection unit 2, inner walls of the cooling plate units (comprising the first cooling plate unit 31 and the second cooling plate unit 32), and the flow guide elements 30 together form a flow space 4 of the coolant. Further, a first partition 13 is disposed between the first liquid collection area 11 and the third liquid collection area 12, and the first partition 13 can prevent the fluid in the first liquid collection area 11 from directly flowing into the third liquid collection area 12, and an interior of the second liquid collection area 21 is of a communicative structure. With continued reference to FIG. 1, the first liquid collection unit 1 further comprises a first liquid inlet 14 in communication with the first liquid collection area 11 and a first liquid outlet 15 in communication with the third liquid collection area 12. During cooling, the coolant flows into the first liquid collection area 11 from the first liquid inlet 14, flows into the first cooling plate unit 31 from the first liquid collection area 11, then flows through the first cooling plate unit 31 and gathers in the second liquid collection area 21 which serves as a flow diversion area of the coolant. The coolant can change the flow direction when passing through the second liquid collection area 21, then flows into the second cooling plate unit 32, gathers in the third liquid collection area 12 after flowing through the second cooling plate unit 32, and finally flows out through the first liquid outlet 15. On one hand, since the second liquid collection area 21, which forms the flow diversion area of the coolant, can result in a change of direction of the coolant passing through the second liquid collection area 21, a flow path of the fluid in the heat exchanger for cooling battery is increased and an effective utilization rate of the coolant is improved. On the other hand, the flow guide elements 300 arranged alternately can lead to the effect of stirring the coolant to form a turbulent flow during flow of the coolant, thereby enhancing heat exchange capacity between the coolant and the cooling plate units.

Figure 3:
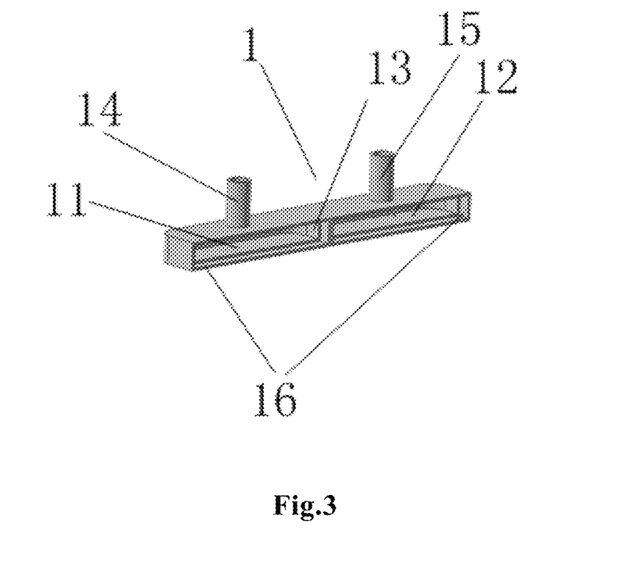
FIG. 3 is a structure view of a first liquid collection unit of the heat exchanger for cooling battery according to the first embodiment of the present invention.
Figure 4:
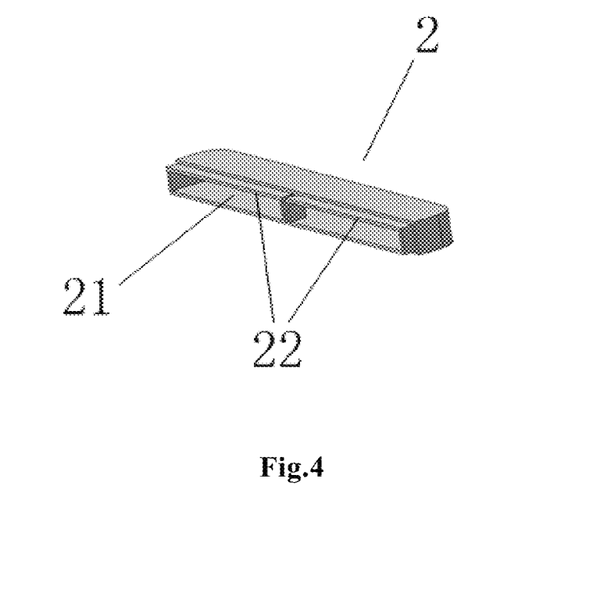
FIG. 4 is a structure view of a second liquid collection unit of the heat exchanger for cooling battery according to the first embodiment of the present invention.
Figure 5:
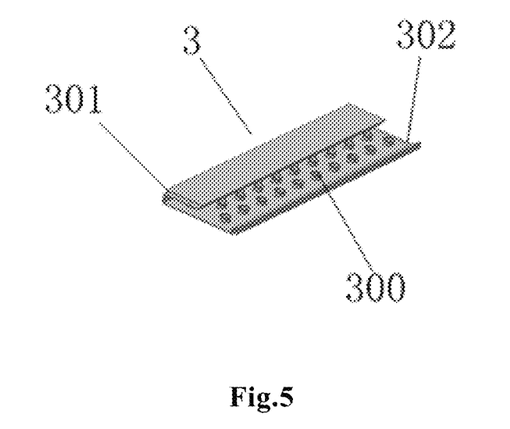
FIG. 5 is a half-sectional structure view of a cooling plate unit of the heat exchanger for cooling battery according to the first embodiment of the present invention.

The structure of the heat exchanger for cooling battery according to the present invention is described below more clearly with reference to FIGS. 3, 4 and 5. FIG. 3 is a structure view of the first liquid collection unit of the heat exchanger for cooling battery according to the first embodiment of the present invention; FIG. 4 is a structure view of the second liquid collection unit of the heat exchanger for cooling battery according to the first embodiment of the present invention; and FIG. 5 is a half-sectional structure view of the cooling plate unit of the heat exchanger for cooling battery according to the first embodiment of the present invention. As shown in FIG. 5, the cooling plate unit 3 comprises a plurality of flow guide elements 300 distributed alternately. In addition, the cooling plate unit 3 further comprises a first connection structure 301 and a second connection structure 302. FIG. 3 clearly shows the structures of various parts of the first liquid collection unit 1. As shown in FIG. 3, the first liquid collection unit 1 comprises a first liquid collection area 11, a third liquid collection area 12, a first partition 13, a first liquid inlet 14 and a first liquid outlet 15, and the first liquid collection unit 1 is further provided thereon with a third connection structure 16 matching with the first connection structure 302. FIG. 4 clearly shows the structures of various parts of the second liquid collection unit 2. As shown in FIG. 4, the second liquid collection unit 2 comprises a second liquid collection area 21, and an interior of the second liquid collection area 21 is of a communicative structure. The second liquid collection unit 2 is further provided thereon with a fourth connection structure 22 matching with the second connection structure 302. The first connection structure 301 and the third connection structure 16, the second connection structure 302 and the fourth connection structure 22, as well as the first connection structure 301 and the second connection structure 302 are respectively connected in a way of being inserted into each other, thereby forming the structure of the entire heat exchanger for cooling battery. Further, in order to prevent liquid leakage, the first connection structure 301 and the third connection structure 16, the second connection structure 302 and the fourth connection structure 22, as well as the first connection structure 301 and the second connection structure 302 are sealed by adhesive, fusion welding or laser welding or the like after being respectively connected by being inserted into each other.

Reference is made to FIG. 6, which is a view showing a coolant flow path of the heat exchanger for cooling battery according to the first embodiment of the present invention. As shown in FIG. 6, the coolant flows in from the first liquid inlet 14 and gathers in the first liquid collection area 11, then flows into the first cooling plate unit 31, and then gathers in the second liquid collection area 21 after flowing through the first cooling plate unit 31. The second liquid collection area 21 serves as a flow diversion area of the coolant. When passing through the second liquid collection area 21, the coolant can change the flow direction and flow into the second cooling plate unit 32, flows through the second cooling plate unit 32 to gather in the third liquid collection area 12, and finally flows out through the first liquid outlet 15. On one hand, since the second liquid collection area 21, which forms the flow diversion area of the coolant, can result in a change of direction of the coolant passing through the second liquid collection area 21, a flow path of the fluid in the heat exchanger for cooling battery is increased and an effective utilization rate of the coolant is improved. On the other hand, the flow guide elements 300 arranged alternately can lead to the effect of stirring the coolant to form a turbulent flow, thereby enhancing heat exchange capacity between the coolant and the cooling plate units. In FIG. 6, flow channels of the coolant are of a "U" shape.

Figure 7:
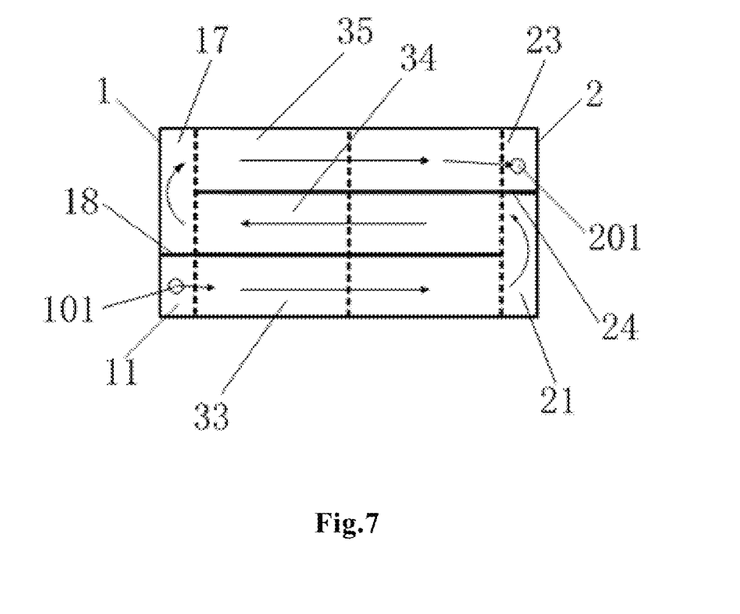
FIG. 7 is a schematic structure view of a heat exchanger for cooling battery according to a second embodiment of the present invention.

The heat exchanger for cooling battery of the present invention is used in a cooling system for battery pack of new energy vehicle, is placed at a lower part of a battery pack module unit or between battery pack modules, and is connected to the module unit through thermal conductive material. Further, in practical applications, the cooling system for battery pack may also be formed by multiple heat exchanger units for cooling battery connected in parallel or in series. In the above embodiment, in order to meet cooling requirements of battery packs or battery modules of different sizes, the cooling plate units 31, 32 can be transversely and longitudinally increased in number between the first liquid collection unit 1 and the second liquid collection unit 2, and the first liquid collection unit 1 and the second liquid collection unit 2 are adaptively designed to meet the requirements. Specifically, reference is made to FIG. 7, which is a schematic structure view of a heat exchanger for cooling battery according to a second embodiment of the present invention. For the sake of clarity, the flow guide elements 300 are omitted in the figure. The difference between this embodiment and the first embodiment is that a cooling plate unit is added longitudinally (in a vertical direction in FIG. 7) between the first liquid collection unit 1 and the second liquid collection unit 2, and thus the schematic structure view of the present embodiment is only provided by way of example. As shown in FIG. 7, the first liquid collection unit 1 and the second liquid collection unit 2 comprises a third cooling plate unit 33, a fourth cooling plate unit 34 and a fifth cooling plate unit 35. The first liquid collection unit 1 comprises a fourth liquid collection area 17, a first liquid collection area 11, and a second liquid inlet 101 in communication with the first liquid collection area 11. The second liquid collection unit 2 comprises a fifth liquid collection area 23, a second liquid collection area 21, and a second liquid outlet 201 in communication with the fifth liquid collection area 23. A second partition 18 is provided between the fourth liquid collection area 17 and the first liquid collection area 11, and a third partition 24 is provided between the fifth liquid collection area 23 and the second liquid collection area 21. During the cooling, the coolant flows in from the second liquid inlet 101 ad gathers in the first collection area 11, and then flows through the third cooling plate unit 33 into the second liquid collection area 11. The coolant changes direction in the second liquid collection area 21, flows into the fourth cooling plate unit 34 and gathers in the fourth liquid collection area 17; then the coolant changes direction once again in the fourth liquid collection area 17, flows into the fifth cooling plate unit 35 and gathers in the fifth liquid collection area 23, and finally flows out through the second liquid outlet 201. In FIG. 7, flow channels of the coolant are of an "S" shape. In the second embodiment, the cooling plate units 3 can be longitudinally increased in number between the first liquid collection unit 1 and the second liquid collection unit 2, and the first liquid collection unit 1 and the second liquid collection unit 2 are adaptively modified in design so as to meet the requirements. It can be understood by those skilled in the art that multiple cooling plate units 3 can be added longitudinally between the first liquid collection unit 1 and the second liquid collection unit 2 as required.

Figure 8:
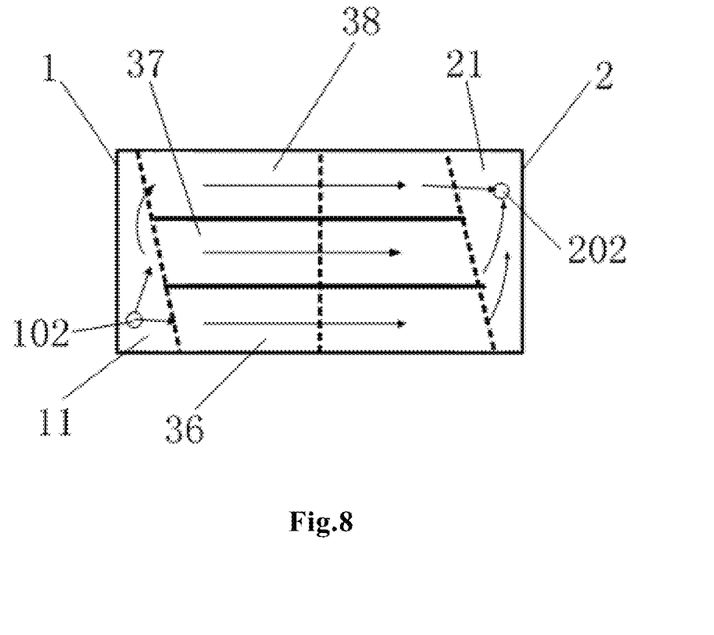
FIG. 8 is a schematic structure view of a heat exchanger for cooling battery according to a third embodiment of the present invention.

Reference is made to FIG. 8, which is a schematic structure view of a heat exchanger for cooling battery according to a third embodiment of the present invention. For the sake of clarity, the flow guide elements 300 are omitted in the figure. As compared with the second embodiment, the present embodiment modifies the design of the first liquid collection unit 1 and the second liquid collection unit 2. Specifically, as shown in FIG. 8, the first liquid collection unit 1 and the second liquid collection unit 2 comprise a sixth cooling unit 36, a seventh cooling unit 37 and an eighth cooling unit 38. The first liquid collection unit 1 further comprises a third liquid inlet 102 in communication with the first liquid collection area 11. The second liquid collection unit 2 further comprises a third liquid outlet 202 in communication with the second liquid collection area 21. The first liquid collection area 11 and the second liquid collection area 21 each has an inclined communication structure. During the cooling, the coolant enters the first liquid collection area 11 from the third liquid inlet 102 and gathers in this area, and then the coolant flows into the second liquid collection area 21 along the sixth cooling unit 36, the seventh cooling unit 37 and the eighth cooling unit 38 simultaneously, gathers in the second liquid collection area 21, and finally flows out through the third liquid outlet 202. Flow channels of the coolant are of an "I" shape.

It should be noted that in the above embodiments, as to the cooling plate unit 3 between the first liquid collection unit 1 and the second liquid collection unit 2, suitable cooling plate units may be also added as required in a transverse direction (left-right direction in the figure) in such a way that the first connection structure 301 and the second connection structure 302 are inserted into each other.

In the above preferred embodiments, the first liquid collection unit 1, the second liquid collection unit 2 and the cooling plate unit 3 are all made of plastic or thermally conductive plastic material, and the cooling plate unit 3 and the flow guide element 300 are formed integrally through injection molding.

To sum up, the heat exchanger for cooling battery of the present invention adopts a modular design, which can make corresponding combinations and changes according to variation of structure size of the battery pack, thus resulting in a great degree of freedom of structure size, for example, the "U"-shaped coolant flow channels in the first embodiment, the "S"-shaped coolant flow channels in the second embodiment and the "I"-shaped coolant flow channels in the third embodiment. The heat exchanger for cooling battery has good expandability, reduces cost and shortens production cycle. In addition, taking the first embodiment as an example, the coolant enters the heat exchanger for cooling battery from the first liquid inlet, gathers in the first liquid collection area, and then flows through the cooling plate unit. Under the action of the flow guide elements arranged alternately, the coolant flows in all directions, thus facilitating a uniform distribution of speed of the coolant in the cooling plate unit and improvement of convective heat exchange between the cooling plate and the coolant so as to achieve more uniform distribution of temperature over the entire region of the cooling plate unit and meanwhile improve heat exchange efficiency of the cooling plate. The coolant has its flow direction changed after passing through the second liquid collection area, enters the cooling plate unit body again, finally gathers in the third liquid collection area and flows out through the liquid outlet.

Hitherto, the technical solutions of the present invention have been described in conjunction with the preferred embodiments shown in the drawings. However, it can be readily understood by those skilled in the art that the scope of the present invention is obviously not limited to these specific embodiments. Under the premise of not departing from the principle of the present invention, equivalent alterations or replacements to the relevant technical features can be made by those skilled in the art, and all these technical solutions after alterations or replacements will fall within the scope of protection of the present invention.

What is claimed is:

1. A heat exchanger for cooling a battery, characterized in that the heat exchanger for cooling battery comprises a first liquid collection unit, a second liquid collection unit, and multiple cooling plate units arranged between the first liquid collection unit and the second liquid collection unit,
    the first liquid collection unit at least comprises a first liquid collection area,
    the second liquid collection unit at least comprises a second liquid collection area, and
    each of the cooling plate units comprises a plurality of flow guide elements;
    wherein an inner wall of the first liquid collection unit, an inner wall of the second liquid collection unit, inner walls of multiple cooling plate units and the flow guide elements together form a flow space for coolants by connecting the inner walls of multiple cooling plate units, and the coolants are distributed over the entire width of the interconnected inner walls of multiple cooling plate units.

2. The heat exchanger for cooling a battery according to claim 1, wherein the flow guide elements are of a cylindrical shape, and are arranged alternately on the cooling plate unit in a coolant flow direction.

3. The heat exchanger for cooling a battery according to claim 1, wherein the cooling plate unit comprises a first connection structure and a second connection structure; the first liquid collection unit is provided with a third connection structure matching with the first connection structure; the second liquid collection unit is provided with a fourth connection structure matching with the second connection structure; and
    the first connection structure and the third connection structure, as well as the second connection structure and the fourth connection structures are respectively connected together in a way of being inserted into each other.

4. The heat exchanger for cooling a battery according to claim 3, wherein the first connection structure of the cooling plate unit is connectable to the second connection structure in a way of being inserted into each other, so that the cooling plate unit can be added between the first liquid collection area and the second liquid connection area.

5. The heat exchanger for cooling a battery according to claim 4, wherein the first connection structure and the third connection structure, the second connection structure and the fourth connection structure, as well as the first connection structure and the second connection structure are respectively connected together in a way of being inserted into each other, and are sealed by adhesive, fusion welding or laser welding.

6. The heat exchanger for cooling a battery according to claim 1, wherein the first liquid collection unit, the second liquid collection unit and the cooling plate unit are all made of thermally conductive plastic material.

7. The heat exchanger for cooling a battery according to claim 6, wherein the cooling plate unit and the flow guide elements are formed integrally through injection molding.

8. The heat exchanger for cooling a battery according to claim 1, wherein the first liquid collection unit further comprises a third liquid collection area, and a first liquid inlet in communication with the first liquid collection area and a first liquid outlet in communication with the third liquid collection area, a first partition is provided between the third liquid collection area and the first liquid collection area, and the cooling plate unit at least comprises a first cooling plate unit and a second cooling plate unit,
    the first cooling plate unit and the second cooling plate unit each have one end in sealing connection with the first liquid collection unit, and the other end in sealing connection with the second liquid collection unit, and
    a coolant flows in through the first liquid inlet, passes through the first liquid collection area, the first cooling plate unit, the second liquid collection area, the second cooling plate unit and the third liquid collection area in sequence, and flows out through the first liquid outlet.

9. The heat exchanger for cooling a battery according to claim 2, wherein the first liquid collection unit further comprises a third liquid collection area, and a first liquid inlet in communication with the first liquid collection area and a first liquid outlet in communication with the third liquid collection area, a first partition is provided between the third liquid collection area and the first liquid collection area, and the cooling plate unit at least comprises a first cooling plate unit and a second cooling plate unit,
    the first cooling plate unit and the second cooling plate unit each have one end in sealing connection with the first liquid collection unit, and the other end in sealing connection with the second liquid collection unit, and
    a coolant flows in through the first liquid inlet, passes through the first liquid collection area, the first cooling plate unit, the second liquid collection area, the second cooling plate unit and the third liquid collection area in sequence, and flows out through the first liquid outlet.

10. The heat exchanger for cooling a battery according to claim 3, wherein the first liquid collection unit further comprises a third liquid collection area, and a first liquid inlet in communication with the first liquid collection area and a first liquid outlet in communication with the third liquid collection area, a first partition is provided between the third liquid collection area and the first liquid collection area, and the cooling plate unit at least comprises a first cooling plate unit and a second cooling plate unit,
    the first cooling plate unit and the second cooling plate unit each have one end in sealing connection with the first liquid collection unit, and the other end in sealing connection with the second liquid collection unit, and
    a coolant flows in through the first liquid inlet, passes through the first liquid collection area, the first cooling plate unit, the second liquid collection area, the second cooling plate unit and the third liquid collection area in sequence, and flows out through the first liquid outlet.

11. The heat exchanger for cooling a battery according to claim 4, wherein the first liquid collection unit further comprises a third liquid collection area, and a first liquid inlet in communication with the first liquid collection area and a first liquid outlet in communication with the third liquid collection area, a first partition is provided between the third liquid collection area and the first liquid collection area, and the cooling plate unit at least comprises a first cooling plate unit and a second cooling plate unit, the first cooling plate unit and the second cooling plate unit each have one end in sealing connection with the first liquid collection unit, and the other end in sealing connection with the second liquid collection unit, and a coolant flows in through the first liquid inlet, passes through the first liquid collection area, the first cooling plate unit, the second liquid collection area, the second cooling plate unit and the third liquid collection area in sequence, and flows out through the first liquid outlet.

* * * * *